(12) United States Patent
Light-Holets et al.

(10) Patent No.: US 12,280,689 B2
(45) Date of Patent: Apr. 22, 2025

(54) POWER CHARGING CONTROL SYSTEMS AND METHODS FOR ELECTRIC VEHICLES

(71) Applicant: Cummins Inc., Columbus, IN (US)

(72) Inventors: Jennifer K. Light-Holets, Greenwood, IN (US); Julie Furber, Columbus, IN (US); Thomas A. Dollmeyer, Columbus, IN (US); Vivek A. Sujan, Columbus, IN (US); Vinoo Thomas, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/425,980

(22) Filed: Jan. 29, 2024

(65) Prior Publication Data

US 2024/0166073 A1     May 23, 2024

Related U.S. Application Data

(63) Continuation of application No. 17/054,712, filed as application No. PCT/US2019/052269 on Sep. 20, 2019, now Pat. No. 11,926,236.
(Continued)

(51) Int. Cl.
*B60L 53/63*     (2019.01)
*B60L 50/62*     (2019.01)
(Continued)

(52) U.S. Cl.
CPC ............... *B60L 53/63* (2019.02); *B60L 50/62* (2019.02); *B60L 53/66* (2019.02); *B60L 53/68* (2019.02); *B60L 2240/72* (2013.01)

(58) Field of Classification Search
None
See application file for complete search history.

(56) References Cited

U.S. PATENT DOCUMENTS

| 7,693,609 B2 | 4/2010 | Kressner et al. |
| 8,346,401 B2 | 1/2013 | Pollack et al. |

(Continued)

FOREIGN PATENT DOCUMENTS

| CN | 101436689 A | 5/2009 |
| CN | 103097175 A | 5/2013 |

(Continued)

OTHER PUBLICATIONS

Machine translation of DE-102017100208-A1 (Year: 2023).*
(Continued)

*Primary Examiner* — David V Henze-Gongola
(74) *Attorney, Agent, or Firm* — Faegre Drinker Biddle & Reath LLP

(57) ABSTRACT

A system is provided for performing an automated power charging process for one or more electric vehicles using a processor. Included in the processor is a charge controller that calculates a capacity of a power grid system by communicating with the power grid system via a network, and a power demand level of the one or more electric vehicles to satisfy one or more mission requirements of each electric vehicle. The power demand level of the one or more electric vehicles is compared with the capacity of the power grid system. In response to the comparison, at least one charging mode is selected from an override mode and an internal combustion engine mode for performing the automated power charging process. The charge controller automatically charges the one or more electric vehicles based on the selected at least one charging mode.

25 Claims, 7 Drawing Sheets

Related U.S. Application Data

(60) Provisional application No. 62/733,976, filed on Sep. 20, 2018.

(51) Int. Cl.
    *B60L 53/66*     (2019.01)
    *B60L 53/68*     (2019.01)

(56) References Cited

U.S. PATENT DOCUMENTS

| | | |
|---|---|---|
| 9,376,958 B1 | 6/2016 | Bonora et al. |
| 9,431,827 B2 | 8/2016 | Chow et al. |
| 9,766,671 B2 | 9/2017 | Dorn et al. |
| 9,780,567 B2 | 10/2017 | Hunt et al. |
| 2009/0091291 A1 | 4/2009 | Woody et al. |
| 2010/0003545 A1* | 1/2010 | Horne ............... B60L 53/52 429/105 |
| 2011/0245967 A1 | 10/2011 | Shah et al. |
| 2011/0245987 A1 | 10/2011 | Pratt et al. |
| 2013/0006677 A1 | 1/2013 | Anglin et al. |
| 2013/0018821 A1 | 1/2013 | Shao |
| 2013/0197710 A1 | 8/2013 | Hansen |
| 2013/0204471 A1* | 8/2013 | O'Connell ............... B60L 53/68 701/22 |
| 2013/0211988 A1 | 8/2013 | Dorn et al. |
| 2014/0214224 A1 | 7/2014 | Watkins et al. |
| 2015/0165917 A1 | 6/2015 | Robers et al. |
| 2015/0360575 A1 | 12/2015 | Frank et al. |
| 2017/0036560 A1 | 2/2017 | Schuelke et al. |
| 2017/0043674 A1 | 2/2017 | Deboer, III |
| 2017/0088001 A1 | 3/2017 | Haas et al. |
| 2017/0190256 A1 | 7/2017 | Mcgrath et al. |
| 2017/0207626 A1 | 7/2017 | Miller et al. |
| 2018/0281612 A1* | 10/2018 | Perry ............... H04W 4/80 |
| 2018/0358839 A1* | 12/2018 | Perez ............... H02J 3/46 |
| 2020/0023747 A1* | 1/2020 | Logvinov ............... B60L 53/305 |
| 2021/0061121 A1 | 3/2021 | Light-Holets et al. |
| 2022/0072966 A1 | 3/2022 | Frank et al. |

FOREIGN PATENT DOCUMENTS

| | | | |
|---|---|---|---|
| CN | 103562001 A | 2/2014 | |
| CN | 103619643 A | 3/2014 | |
| CN | 104160546 A | 11/2014 | |
| CN | 104540706 A | 4/2015 | |
| CN | 105172787 A | 12/2015 | |
| CN | 205059589 U | 3/2016 | |
| DE | 102017100208 A1 * | 7/2017 | ............... B60L 50/15 |
| EP | 2708403 A2 | 3/2014 | |
| EP | 3130504 A1 | 2/2017 | |
| GB | 2505929 A * | 3/2014 | ............... B60L 11/1844 |
| WO | 2011/156776 A2 | 12/2011 | |
| WO | 2014/087426 A2 | 6/2014 | |
| WO | 2016/133844 A1 | 8/2016 | |

OTHER PUBLICATIONS

International Search Report and Written Opinion received for PCT Patent Application No. PCT/US2019/052269, mailed on Feb. 3, 2020, 11 pages.

International Preliminary Report on Patentability received for PCT Patent Application No. PCT/US2019/052269, mailed on Apr. 1, 2021, 9 pages.

International Search Report and Written Opinion issued by the ISA/US, Commissioner for Patents, dated Jan. 16, 2020, for International Application No. PCT/US2019/052269; 11 pages.

EP-2708403-A2 Machine translation. (Year: 2023).

Examination Report for European patent application No. 19862169.0, mailed Nov. 7, 2024.

\* cited by examiner

POWER CHARGING CONTROL SYSTEMS AND METHODS FOR ELECTRIC VEHICLES

CROSS-REFERENCE TO RELATED PATENT APPLICATIONS

This application claims priority to and is a continuation of U.S. Ser. No. 17/054,712, filed Nov. 11, 2020, which claims priority to and is a U.S. national stage of International Patent Application No. PCT/US2019/052269, filed Sep. 20, 2019, which is based on U.S. Provisional Patent Application No. 62/733,976, filed Sep. 20, 2018 the entire disclosures of which being expressly incorporated herein by their reference.

TECHNICAL FIELD

This disclosure relates generally to methods and systems for charging electric vehicles, and more particularly to controlling power charging processes of the electric vehicles.

BACKGROUND

Recently, the need to reduce fossil fuel consumption and reduce emissions in various systems, such as generators, automobiles, and other vehicles powered by internal combustion engines is continuing to grow in light of new governmental regulations, customer demand, and in an effort to reduce the operating costs of such systems. In an attempt to address these needs, some efforts have included the use of both an electric motor and an internal combustion engine (ICE), such as, for example, a hybrid electric vehicle (HEV). In some cases, a pure electric vehicle (EV) operated by a battery only has been introduced to address the needs.

Thus, the electric vehicles (e.g., both the hybrid and pure electric vehicles) provide an alternative to conventional fuel engine systems for either supplementing or completely replacing the engine systems, such as the ICEs. In one example, an alternative vehicle is known as an extended range electric vehicle (EREV). In the EREV, primary electric drive is achieved with a battery or related rechargeable energy storage system (RESS) that acts as a direct current (DC) voltage source to a motor, generator or transmission that in turn can be used to provide the energy needed to rotate one or more of the vehicle's wheels. When the electrical charge from the RESS has been depleted, backup power may come from the ICE to provide auxiliary onboard electrical energy generation.

Referring now to FIG. 1, an exemplary conventional power grid system 10 is shown. Typically, electric power is generated by a power station 12 and transmitted to a power transformer 14. Using transmission towers 16, the electric power can be transmitted to one or more transmission substations 18. For further distribution, the electric power is distributed by a distribution station 20 via a plurality of grid networks 22. Subsequently, the electric power is distributed to a manufacturing plant 24, a business consumer 26, and/or a residential consumer 28. For charging the electric vehicle, an external power source, such as power grid system 10, is electrically coupled to a battery assembly of the electric vehicle to allow recharging of the battery assembly. For example, a connector cable of the electric vehicle owned by residential consumer 28 is plugged into a household electrical outlet of his or her house for charging the electric vehicle.

However, charging the electric vehicles, such as the EV and HEV, can be challenging due to different energy requirements of each vehicle and various power sources provided from the external power source to different electric vehicles. For example, charging time can range from minutes to several hours depending on an extent to which the battery assembly has been depleted and a voltage/frequency of the outlet. Also, the time of day during which the electric vehicle charges is important because the charging time of day impacts power grid stress levels and often determines a cost per kilowatt-hour that residential consumer 28 pays for electricity.

As another example, during a peak demand condition, power grid system 10 can be overloaded with the power demand from various consumers, such as manufacturing plant 24, business consumer 26, and residential consumer 28. To alleviate the overloading condition, an extra demand charge can be applied to the consumers to deter them from using power grid system 10. For example, the extra demand charge is typically for commercial customers and is based on the highest usage spike (peak load) in a billing period. The cost-per-kilowatt per hour increases during the high usage periods. As a result, an unwanted increase of the demand charge can appear in an electric bill during the peak demand condition. Further, the overloading condition caused by the peak demand condition can adversely impact power charging processes of the electric vehicles connected to power grid system 10.

Accordingly, there are opportunities to develop enhanced power charging systems and methods that can more efficiently control the power charging processes of the electric vehicles.

SUMMARY

In one embodiment, a computer-implemented method is provided for performing an automated power charging process for one or more electric vehicles using a processor. The method includes calculating, using the processor, a capacity of a power grid system by communicating with the power grid system via a network, determining, using the processor, a power demand level of the electric vehicles to satisfy one or more mission requirements of each electric vehicle, and comparing, using the processor, the power demand level of the electric vehicles with the capacity of the power grid system. In response to the comparison, the method further includes, using the processor, selecting at least one charging mode from an override mode and an internal combustion engine mode for performing the automated power charging process. The method also includes charging the electric vehicles based on the selected at least one charging mode.

In another embodiment, a system is provided for performing an automated power charging process for one or more electric vehicles using a processor. The processor has a charge controller configured to calculate a capacity of a power grid system by communicating with the power grid system via a network, and determine a power demand level of the electric vehicles to satisfy one or more mission requirements of each electric vehicle. The charge controller is further configured to compare the power demand level of the electric vehicles with the capacity of the power grid system. In response to the comparison, the charge controller selects at least one charging mode from an override mode and an internal combustion engine mode for performing the automated power charging process, and automatically charges the electric vehicles based on the selected at least one charging mode.

In yet another embodiment, a computer-implemented method is provided for performing an automated power charging process for one or more electric vehicles using a processor. The method includes calculating, using the processor, a capacity of a power grid system by communicating with the power grid system via a network, and determining, using the processor, a power demand level of the electric vehicles to satisfy one or more mission requirements of each electric vehicle. The method further includes comparing, using the processor, the power demand level of the electric vehicles with the capacity of the power grid system. In response to the comparison, the method includes, using the processor, ranking the electric vehicles based on a predetermined priority using one or more charging factors. The method further includes redistributing, using the processor, a load increment of the electric vehicles based on the predetermined priority, and charging the electric vehicles based on the redistributed load increment of the electric vehicles.

In still another embodiment, a system is provided for performing an automated power charging process for one or more electric vehicles using a processor. The processor has a charge controller configured to calculate a capacity of a power grid system by communicating with the power grid system via a network, and determine a power demand level of the electric vehicles to satisfy one or more mission requirements of each electric vehicle. The charge controller compares the power demand level of the electric vehicles with the capacity of the power grid system. In response to the comparison, the charge controller ranks the electric vehicles based on a predetermined priority using one or more charging factors, redistributes a load increment of the electric vehicles based on the predetermined priority, and automatically charges the electric vehicles based on the redistributed load increment of the electric vehicles.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1:
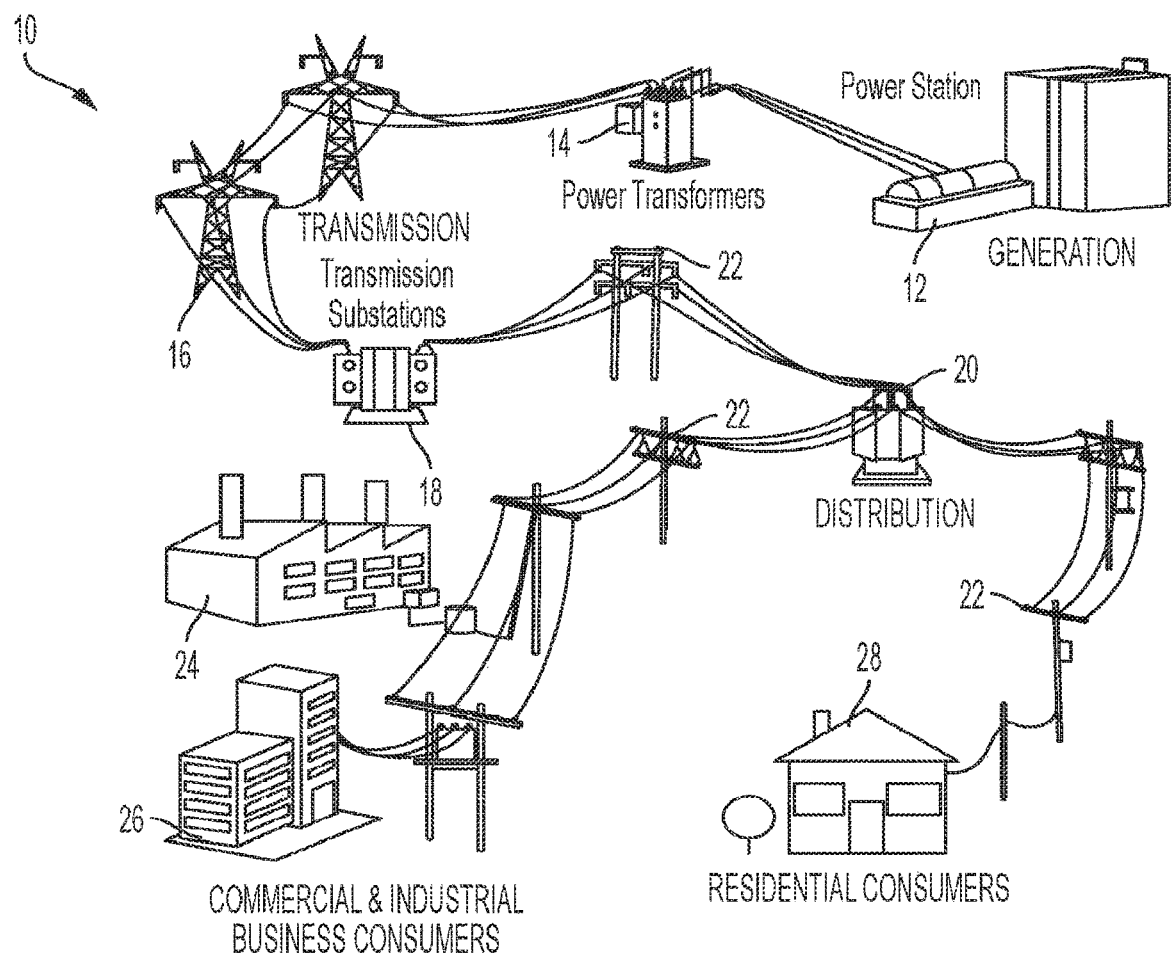
FIG. 1 is a schematic diagram of an exemplary power grid system.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The embodiment disclosed below is not intended to be exhaustive or limit the disclosure to the precise form disclosed in the following detailed description. Rather, the embodiment is chosen and described so that others skilled in the art may utilize its teachings. One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Figure 2:
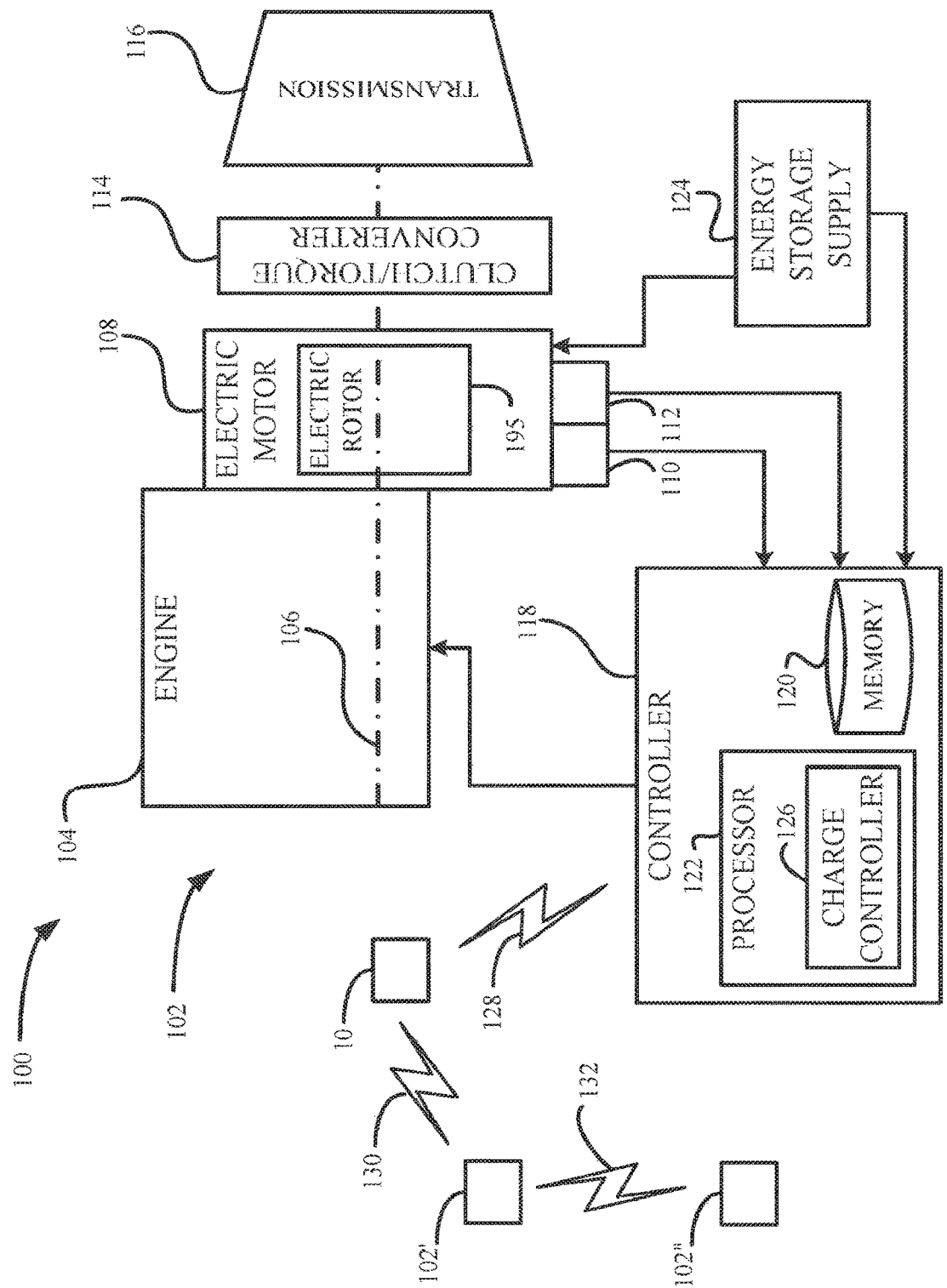
FIG. 2 is a schematic diagram of an engine and electric motor system featuring a charge controller for electric vehicles in accordance with embodiments of the present disclosure.

Referring now to FIG. 2, a hybrid system 100 for an electric vehicle 102 is illustrated. For example, electric vehicle 102 of residential consumer 28 can be plugged into the household electrical outlet to be connected to power grid system 10 for performing a power charging process of electric vehicle 102. Other examples include commercial vehicles connected to power grid system 10. In one embodiment, power grid system 10 can be a grid system implemented in a specific commercial facility, such as a bus depot. In another embodiment, power grid system 10 can be a grid system implemented in a grid network incorporating a plurality of power stations, such as power plants and other power-generating facilities. In FIG. 2, although electric vehicle 102 having a parallel hybrid system is shown, the present disclosure can also be applied to a range-extended vehicle or a series hybrid vehicle to suit different applications. As such, electric vehicle 102 includes any electric vehicles having an electric propulsion system (e.g., the hybrid, pure electric, and/or range-extended vehicles).

Although electric vehicle 102 with an internal combustion engine 104 is shown, the present disclosure can be applied to a pure electric vehicle powered by only batteries without engine 104. In this example, hybrid system 100 can include internal combustion engine 104 having a crankshaft 106 and a crankshaft sprocket (not shown) coupled to the crankshaft. Engine 104 is not particularly limited and can be any type of reciprocating engine, such as a diesel engine or a gasoline engine. For example, internal combustion engine 104 can be on-board (e.g., the range-extended vehicle) or off-board (e.g., a genset located at the bus depot).

Hybrid system 100 can also include an electric motor 108 in mechanical communication with the crankshaft sprocket. For example, electric motor 108 can be a traction motor used for propulsion of electric vehicle 102. In various embodiments, electric motor 108 can be coupled to a speed sensor 110, a torque sensor 112, engine 104, a clutch or torque converter 114, and a transmission 116 via crankshaft 106. In various embodiments, speed sensor 110 and electric motor 108 are in mechanical and electrical communication with crankshaft 106. For example, by being in mechanical communication, a relative position can be maintained and operational control of engine 104 can continue. Also, electric motor 108 is not particularly limited and, for example, can be a motor/generator, synchronous motor, or an induction motor.

In embodiments, hybrid system 100 also includes a controller 118 in electrical communication with speed sensor 110 and torque sensor 112 and can include a non-transitory memory 120 having instructions that, in response to execution by a processor 122, cause processor 122 to determine a speed or torque value of electric motor 108. As another example, electric motor 108 electrically receives power from a rechargeable energy storage supply 124, such as a battery pack, and energy storage supply 124 can provide data representative of state-of-charge (SOC) information to controller 118. Processor 122, non-transitory memory 120, and controller 118 are not particularly limited and can, for example, be physically separate.

In certain embodiments, controller 118 can form a portion of a processing subsystem including one or more computing devices having memory, processing, and communication hardware. Controller 118 can be a single device or a distributed device, and functions of controller 118 can be performed by hardware and/or as computer instructions on a non-transient computer readable storage medium, such as non-transient memory 120.

In certain embodiments, controller 118 includes one or more interpreters, determiners, evaluators, regulators, and/or processors 122 that functionally execute the operations of controller 118. The description herein including interpreters, determiners, evaluators, regulators, and/or processor emphasizes the structural independence of certain aspects of controller 118 and illustrates one grouping of operations and responsibilities of controller 118. Other groupings that execute similar overall operations are understood within the scope of the present disclosure. Interpreters, determiners, evaluators, regulators, and processors can be implemented in hardware and/or as computer instructions on a non-transient computer readable storage medium, and can be distributed across various hardware or computer-based components.

Example and non-limiting implementation elements that functionally execute the operations of controller 118 include sensors, such as speed sensor 110 and torque sensor 112, providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In the illustrated embodiment, processor 122 includes a charge controller 126 configured to control a power charging process of electric vehicle 102. In this example, charge controller 126 is included in on-board controller 118 of each electric vehicle 102 in a decentralized way. In another example, charge controller 126 can be an off-board separate unit implemented in an independent computing device, such as a central server or a personal mobile device, in a centralized way. For example, charge controller 126 can be communicably connected to the central server in a cloud computing network to control the power charging process of electric vehicle 102. It is advantageous that charge controller 126 selectively controls an incremental power load on power grid system 10 as more electric vehicles 102 are connected to power grid system 10. Charge controller 126 is configured to control the power charging process of electric vehicle 102 such that peak power demand in power grid system 10 stays unchanged but overall power demand is maintained at a predetermined level as the number of electric vehicles 102 connected to power grid system 10 increases.

In one embodiment, charge controller 126 automatically communicates with power grid system 10 via a network 128 to determine or calculate a capacity of power grid system 10 at a specific location. Any type of computer network having a collection of computers, servers, and other hardware interconnected by communication channels is contemplated, such as the Internet, Intranet, Ethernet, LAN, etc. In one embodiment, charge controller 126 interfaces with network 128, such as a wireless communication facility (e.g., a Wi-Fi access point). Other similar networks known in the art are also contemplated. For example, network 128 can be a vehicle-to-grid (V2G) network 130 between electric vehicle 102' and power grid system 10, or a vehicle-to-vehicle (V2V) network 132 between a first electric vehicle 102' and a second electric vehicle 102". In some embodiments, vehicles 102, 102', and 102" are designated collectively as 102 herein to suit different applications. Other suitable arrangements of vehicles 102, 102', and 102" including other multiple vehicles are also contemplated to suit the application.

Further, charge controller 126 is configured to determine a power demand level of electric vehicle 102 to satisfy one or more mission requirements for electric vehicle 102. Exemplary mission requirements refer to enabling conditions required for one or more tasks to be performed by electric vehicle 102, such as a battery operational period, a battery life time, a battery state of charge, a number of mileage or an area to be covered, and the like. Thus, based on an information exchange between electric vehicle 102 and power grid system 10 via network 128, the power charging process is automatically controlled by charge controller 126.

Figures 3A, 3B:
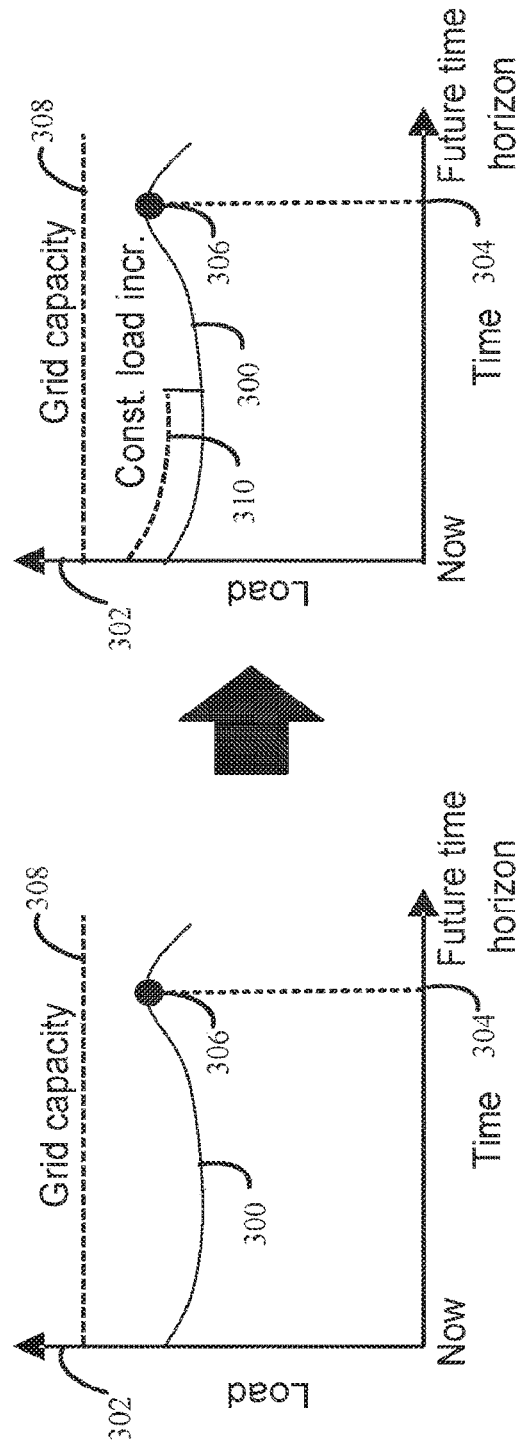
FIGS. 3A and 3B illustrate graphical representations of grid power load conditions during charging of the electric vehicles.

Referring now to FIGS. 3A and 3B, an exemplary graph segment 300 represents a power load level of power grid system 10 as a function of power load 302 shown along a vertical Y-axis and time 304 shown along a horizontal X-axis. As illustrated, as time 304 increases, power load 302 of power grid system 10 can also increase due to the overall power demand of electric vehicles 102 connected to power grid system 10. For example, a fleet of school buses, each bus equipped with an electrified powertrain, can be connected to power grid system 10 to be electrically charged.

At a future time or after a predetermined period (e.g., after school hours) shown on the X-axis time 304 corresponding to a point 306, the school buses return to power grid system 10 at the bus depot for performing the power charging process. At this time, power load 302 of power grid system 10 reaches a maximum power load level 306 for the fleet. As shown in FIG. 3B, when a maximum grid capacity level 308 of power grid system 10 is greater than maximum power load level 306, any consistent load increment 310 can be accommodated by power grid system 10 without any changes. For example, consistent load increment 310 refers to a predetermined load level determined based on a historical or empirical data relating to one or more electric vehicles 102 to be charged.

Figure 4:
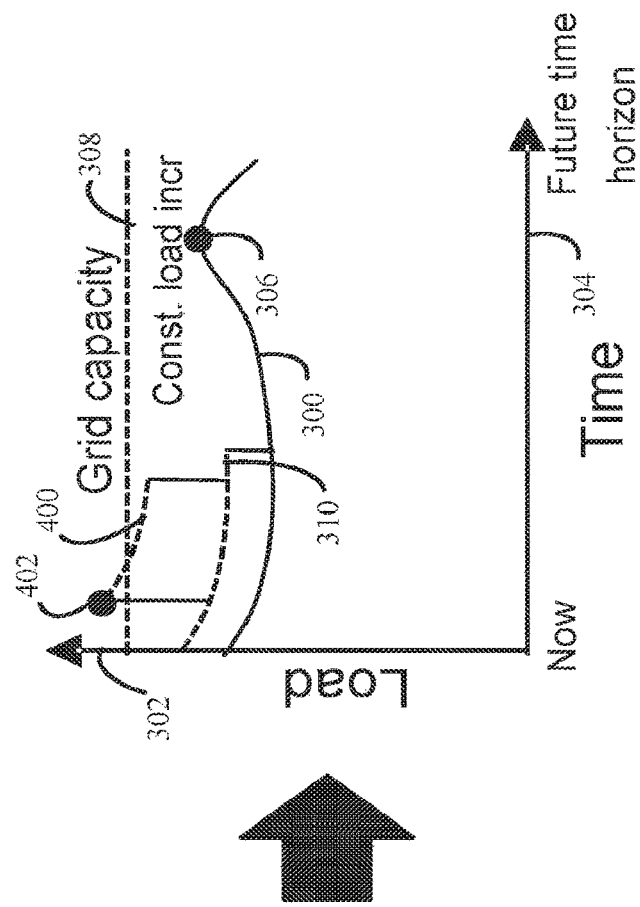
FIG. 4 illustrates a graphical representation of a peak demand condition detected during the grid power load conditions shown in FIG. 3B.

Referring now to FIG. 4, however, when an additional load increment 400 is required by extra buses or other electric devices, such as an air conditioner or HVAC control system installed in electric vehicle 102, maximum power load level 306 can be increased to a new maximum point 402. When maximum grid capacity level 308 of power grid system 10 is less than new maximum point 402, power grid system 10 either can be overloaded or can impose or increase the demand charge in the electric bill for the fleet. In one embodiment, to avoid the overload and/or demand charge conditions, charge controller 126 automatically detects a peak demand condition based on information about at least one charging condition, e.g., an increased number of electric vehicles 102 for charging, during the power charging process. As another example, the information about the at least one charging condition includes a battery state of charge, a battery charge limit, a battery health, a battery temperature, an environment or ambient temperature, a desired energy increase for electric vehicle 102, an available time for the energy increase, and the like.

Figure 5:
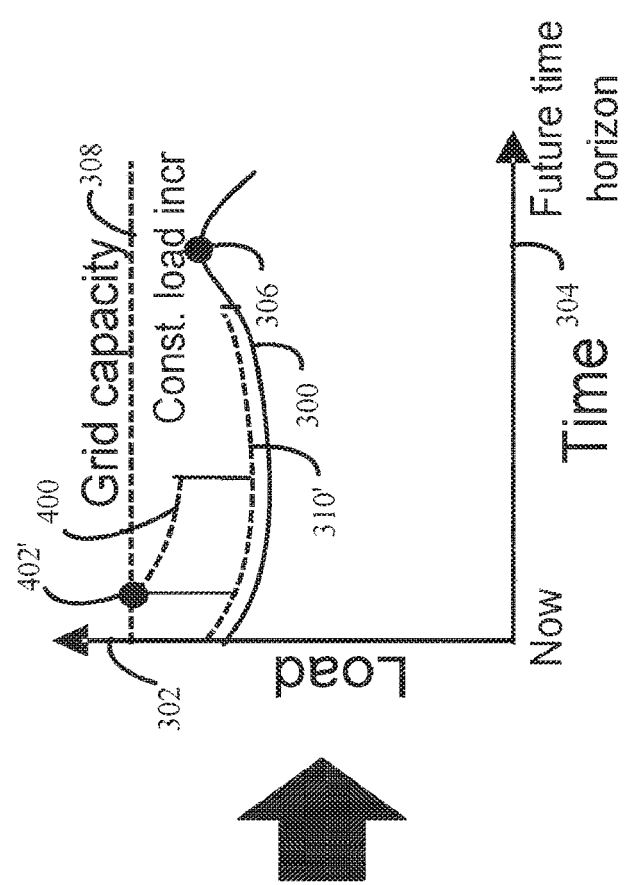
FIG. 5 illustrates a graphical representation of an exemplary power charging control method using the charge controller of FIG. 2 in accordance with embodiments of the present disclosure.

Referring now to FIG. 5, in one embodiment, charge controller 126 automatically communicates with power grid system 10 to determine maximum grid capacity level 308 of power grid system 10 at a specific location, such as the bus depot or the network grid system. Further, power grid system 10 determines a maximum power load level, such as point 402', of the fleet to maintain the fleet's mission requirements. Also, using the information about one or more applicable charging conditions, such as a change in the number of electric vehicles 102 to be charged, charge controller 126 generates a charging implementation strategy for the fleet.

In one embodiment, the charging implementation strategy includes redistributing consistent load increment 310 based on a predetermined priority. In this example, a power load level of consistent load increment 310 is redistributed as a new load increment 310' following a profile of segment 300 of power grid system 10 during a predetermined period based on the predetermined priority. For example, the predetermined priority can be determined based on a type of load carried by electric vehicle 102 (e.g., perishable v. unperishable), a type of battery installed in electric vehicle 102 (e.g., faster charging battery v. slower charging battery), an anticipated load condition for electric vehicle 102 (e.g., increased load weight v. reduced load weight in the future missions), and the like. Other suitable priority criteria or factors, such as an arbitrary rank preset by an operator or other control systems, can be contemplated to suit different applications.

Returning now to FIGS. 4 and 5, a total amount of charging time for electric vehicles 102 allotted in new load increment 310' (FIG. 5) is longer than the one in consistent load increment 310 (FIG. 4). As shown in FIG. 5, charge controller 126 automatically reduces a power load level required for charging electric vehicles 102 based on the predetermined priority during new load increment 310' such that new maximum point 402' for additional load increment 400 becomes less than or equal to maximum grid capacity level 308. Thus, it is advantageous that although the total amount of charging time is longer this way, the overload and/or demand charge conditions can be avoided. As such, charge controller 126 provides an enhanced power replenishment or recharge strategy for electric vehicles 102.

Figure 6:
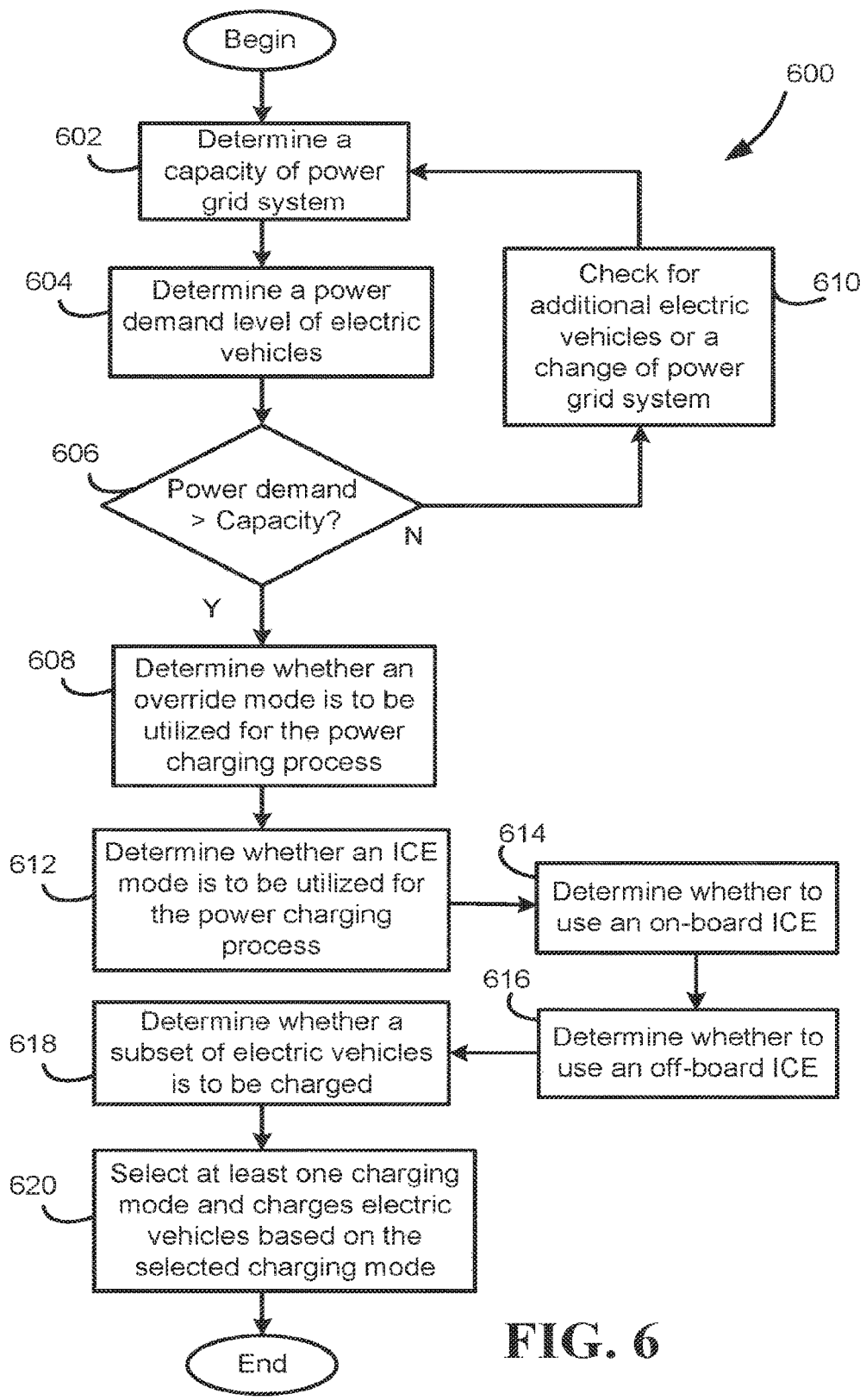
FIG. 6 is a flow chart of an exemplary power charging control method using the charge controller of FIG. 2 in accordance with embodiments of the present disclosure.

Referring now to FIG. 6, an illustrative power charging process is shown for electric vehicle 102 in accordance with embodiments of the subject matter disclosed herein. As disclosed herein, hybrid system 100 is not particularly limited and can perform any of the methods described within the scope of this disclosure. In FIG. 6, a method 600 of performing the automated power charging process is shown using charge controller 126.

At block 602, charge controller 126 determines a capacity of power grid system 10 by communicating with power grid system 10 via network 128. For example, charge controller 126 communicates with power grid system 10 via network 128 to determine a maximum grid capacity level 308 of power grid system 10. In another embodiment, electric vehicles 102, 102' with extra energy available can be also connected to power grid system 10 to increase the capacity of power grid system 10. As such, at least some of electric vehicles 102, 102' connected to power grid system 10 can be used as additional charge repositories (e.g., using respective batteries installed in electric vehicles 102, 102'). In this configuration, it is advantageous that such electric vehicles 102, 102' with extra energy can alleviate uneven energy needs and priorities of other electric vehicles 102". In yet another embodiment, when electric vehicles 102 with extra energy are used as energy sinks or sources, an aging factor of the battery associated with a corresponding electric vehicle 102 can be used to determine the priority of electric vehicle 102. For example, the aging factor of the battery can be determined based on a number of charging events for the corresponding electric vehicle 102. In another embodiment, charge controller 126 notifies the operator or other systems associated with electric vehicle 102 when the battery is scheduled to be replaced based on the aging factor.

Thus, in some embodiments, when electric vehicles 102 are used as energy sinks or sources for sending power back to power grid system 10, the batteries will age faster. Thus, the aging factor of the battery is considered for compensation for the users of electric vehicles 102 and the users will be informed accordingly.

At block 604, charge controller 126 determines a power demand level of electric vehicles 102 to satisfy one or more mission requirements of each electric vehicle 102. For example, depending on the mission to be performed by each electric vehicle 102, charge controller 126 determines maximum power load level 306 required by electric vehicles 102.

At block 606, charge controller 126 compares the power demand level of electric vehicles 102 and the capacity of power grid system 10 to determine whether the power demand level of electric vehicles 102 is greater than the capacity of power grid system 10. For example, charge controller 126 determines whether maximum power load level 306 (or new maximum point 402), as the power demand level, is greater than maximum grid capacity level 308 of power grid system 10. When maximum power load level 306 is greater than maximum grid capacity level 308, control proceeds to block 608. Otherwise, control proceeds to block 610.

At block 608, charge controller 126 determines whether an override mode is to be utilized for the power charging process. For example, the operator or any control system associated with electric vehicles 102 can override to exceed maximum power load level 306 for continuing the power charging process based on a charging cost analysis. Thus, the override mode can cause the increased demand charge in the electric bill. However, when an overall charging cost utilizing the override mode is lower than the overall charging cost without utilizing the override mode, the override mode can be utilized for the power charging process. In another embodiment, charge controller 126 can stop the power charging process for electric vehicles 102 at a predetermined power level that is lower than a desired power level. For example, the desired power level can be the power demand level of electric vehicles.

At block 610, when maximum power load level 306 is less than or equal to maximum power load level 306, charge controller 126 checks if additional electric vehicles 102 are connected to power grid system 10, or if a change of power grid system 10 has occurred. For example, electric vehicles 102 can be connected to a different power grid system 10 due to a failure or malfunction.

At block 612, charge controller 126 determines whether an internal combustion engine (ICE) mode is to be utilized for the power charging process. For example, charge controller 126 automatically activates a range-extender installed in electric vehicle 102. In other embodiments, charge controller 126 can automatically activate an ICE generator, such as a local genset (or an engine generator set), connected to electric vehicle 102. In one example, the ICE generator can be either electrically connected to power grid system 10 or operated independently from power grid system 10 as an off-grid generator.

At block 614, charge controller 126 determines whether to use an on-board ICE for the power charging process. For example, the range-extender can be used to charge electric vehicles.

At block 616, charge controller 126 determines whether to use an off-board ICE for the power charging process. For example, the off-board generator can be associated with a facility, such as the bus depot, or a portable or stationary power-generating device that is installable in the facility. As another example, the off-board generator can be the local genset.

At block 618, charge controller 126 determines whether a subset of electric vehicles 102, 102', 102" is to be charged based on the capacity of power grid system 10 and the power demand level of electric vehicles 102, 102', 102". In one example, charge controller 126 automatically identifies the subset of electric vehicles 102, 102', 102" that cannot be charged due to the overload and/or demand charge conditions. For example, when the power demand level of electric vehicles 102, 102', 102" is greater than the capacity of power grid system 10, charge controller 126 automatically removes the subset of electric vehicles 102, 102', 102" by electrically separating them from power grid system 10 and charges them at a slower predetermined charging rate than a desired charging rate, e.g., using the on-board ICE or the off-board ICE. Thus, it is advantageous that multiple electric vehicles 102, 102', 102" are charged in various manners for different subsets of electric vehicles.

As another example, charge controller 126 automatically removes the subset of electric vehicles 102 by electrically disconnecting them from power grid system 10 and charges them using electric power derived from other electric vehicles 102 that are not part of (or independent of) the subset. For example, the subset of electric vehicles 102 can be charged from the batteries of other vehicles not being used (e.g., due to maintenance or not needed for a mission the next day due to a weekend or holiday). Thus, it is advantageous that the power (e.g., fuel or electricity) can be syphoned from a vehicle not being immediately used to another vehicle that will be used shortly.

At block 620, charge controller 126 selects at least one charging mode from the override mode and the ICE mode for corresponding electric vehicles 102, and automatically charges electric vehicles 102 based on the selected at least one charging mode. For example, charge controller 126 selects the override mode for charging a first subset of electric vehicles 102 and the ICE mode using the off-board ICE for charging at least one second subset of electric vehicles 102. Subsequently, charge controller 126 automatically initiates charging the first and second subsets based on the respective modes. Other suitable combinations of the modes and subsets are also contemplated to suit different applications.

Figure 7:
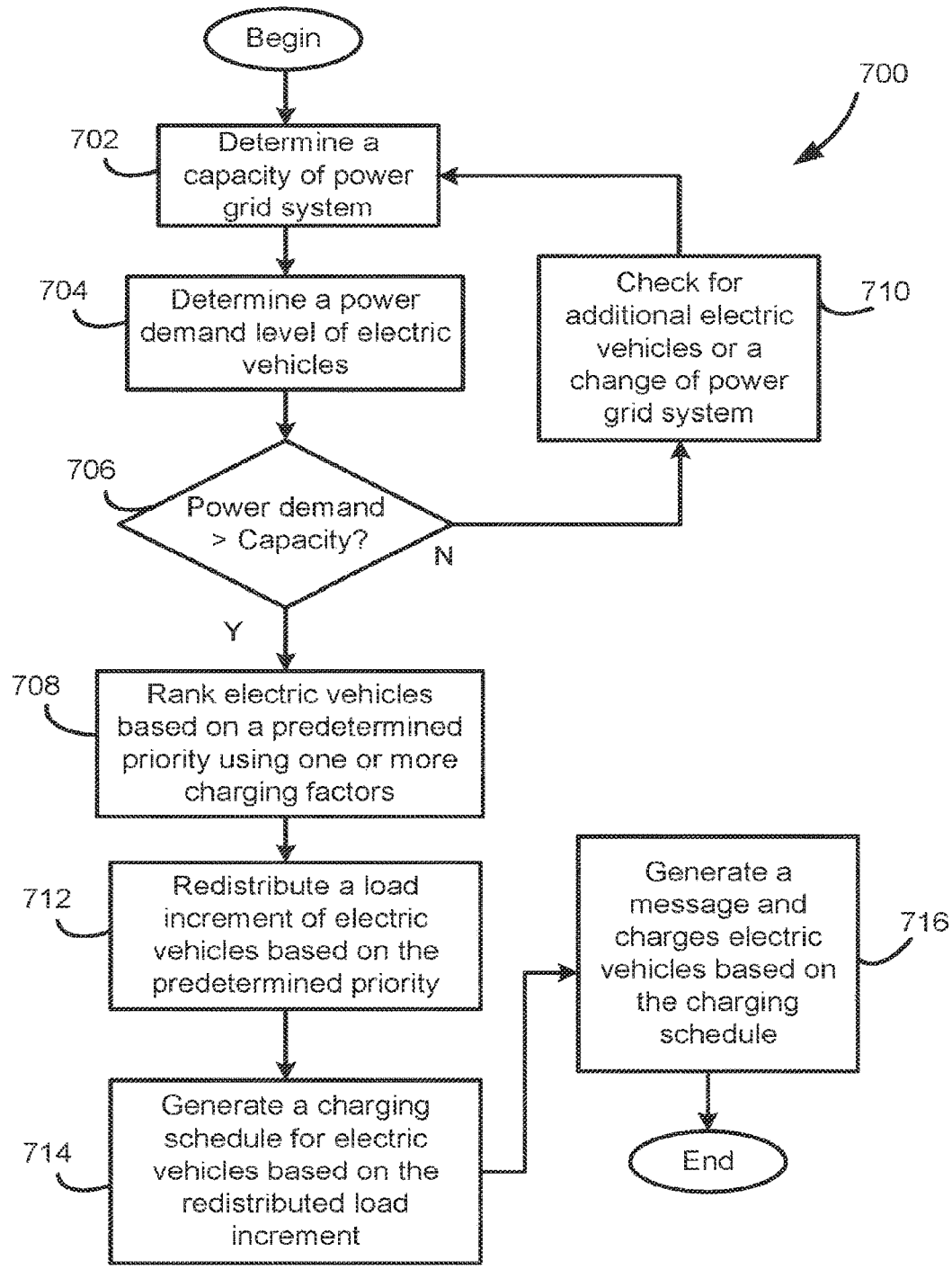
FIG. 7 is a flow chart of another exemplary power charging control method using the charge controller of FIG. 2 in accordance with embodiments of the present disclosure.

Referring now to FIG. 7, another illustrative power charging process is shown for electric vehicle 102 in accordance with embodiments of the subject matter disclosed herein. As disclosed herein, hybrid system 100 is not particularly limited and can perform any of the methods described within the scope of this disclosure. In FIG. 7, a method 700 of performing the automated power charging process is shown using charge controller 126.

At block 702, charge controller 126 determines a capacity of power grid system 10 by communicating via network 128. For example, charge controller 126 communicates with power grid system 10 via network 128 to determine a maximum grid capacity level 308 of power grid system 10.

At block 704, charge controller 126 determines a power demand level of electric vehicles 102 to satisfy the mission requirements of electric vehicles 102. For example, depending on the mission to be performed by each electric vehicle 102, charge controller 126 determines maximum power load level 306 required by electric vehicles 102.

At block 706, charge controller 126 determines whether the power demand level of electric vehicles 102 is greater than the capacity of power grid system 10. For example, charge controller 126 determines whether maximum power load level 306 (or new maximum point 402), as the power demand level, is greater than maximum grid capacity level 308 of power grid system 10. When maximum power load level 306 is greater than maximum grid capacity level 308, control proceeds to block 708. Otherwise, control proceeds to block 710.

At block 708, charge controller 126 ranks electric vehicles 102 based on a predetermined priority using one or more charging factors. Exemplary factors for each electric vehicle 102 can include an amount of charge needed, a time period available to accommodate the power demand level, a current and/or future operating condition (e.g., an ambient temperature or a battery temperature), an anticipated mission time length or power needs for the next mission, data or information of other electric vehicles relating to the power charging process (e.g., data or information shared between electric vehicles 102 via the V2V network), a power load level required for non-electric vehicle applications (e.g., an air conditioner or an HVAC system associated with electric vehicle 102), current health information of power grid system 10 (e.g., known diagnostics from energy suppliers indicating potential failure modes of the grid to limit a current flow), a cost of electricity and/or how the cost changes during a predetermined period, and the like. Each factor can be adjusted or affected by one or more of the rest of factors. In embodiments, the factors can be determined or calculated based on data received from one or more sensors (e.g., GPS sensors, temperature sensors, state-of-charge sensors, weight/load sensors, etc.), vehicle control units (e.g., engine control unit/module, or eco-system control units, etc.), and user input devices. Other suitable sensors and devices, such as information storage systems, are also contemplated to suit the application. As such, it will be apparent to one skilled in the relevant art(s) how to determine or calculate the factors in various embodiments.

In another embodiment, exemplary factors for each electric vehicle 102 can further include a current time during the power charging process (e.g., charging at 2 am v. charging at 5 pm), a traffic condition (e.g., depending on the traffic condition, the charging time can be adjusted by charge controller 126 without disrupting a traffic flow), a road condition (e.g. uphill v. downhill, or rough v. paved), a load condition (e.g., partially loaded v. fully loaded, or load weight), a power need (e.g., based on scheduled, historical, or future needs), and the like.

In yet another embodiment, exemplary factors for each electric vehicle 102 can further include a road grade (e.g., 15-degree uphill), weather information (e.g., based on telematics, empirical, historical, and/or simulation data), a mission status (e.g., a degree of completion of the mission, such as 10% or 90% complete), a load criticality (e.g., refrigerated v. nonperishable food), and the like. Other suitable eco-systems of electric vehicles (e.g., a fan or temperature control) are also contemplated to suit different applications. Each factor can be adjusted or affected by one or more of the rest of factors described above.

At block 710, when maximum power load level 306 is less than or equal to maximum power load level 306, charge controller 126 checks if additional electric vehicles 102 are connected to power grid system 10, or if a change of power grid system 10 has occurred. For example, electric vehicles 102 can be connected to a different power grid system 10 due to a failure or malfunction.

At block 712, charge controller 126 redistribute a load increment of electric vehicles 102 based on the predetermined priority. As discussed above, for example, a power load level of the load increment for electric vehicles 102 is redistributed as a new load increment (e.g., such as the load increment 310') following a profile of the power load level of power grid system 10 during a predetermined period based on the predetermined priority.

At block 714, charge controller 126 generates a charging schedule for electric vehicles 102 based on the redistributed load increment. For example, the charging schedule can include a scheduled time for charging (e.g., separate, overlapping, or concurrent time periods) and a charging rate (e.g., faster charging batteries can be charged first) based on the predetermined priority.

At block 716, charge controller 126 generates a warning or information message for the operator or other systems associated with electric vehicles 102 based on the charging schedule, and automatically charges electric vehicles 102 based on the charging schedule. For example, the warning or information message can be displayed on a dashboard display of electric vehicle 102, and any information relating to the charging schedule can also be displayed or transmitted to other systems associated with electric vehicle 102.

It should be understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

What is claimed is:

1. A computer-implemented method of performing an automated power charging process for a plurality of electric vehicles using a processor, the method comprising:

communicating, using the processor, with a power grid system via a network to determine a capacity of the power grid system;

determining, using the processor, that a power demand level of the electric vehicles to satisfy one or more mission requirements of each electric vehicle is greater than the capacity of the power grid system;

in response to the determining, electrically separating a subset of the electric vehicles from the power grid system;

applying, using the processor, an override mode to increase a maximum power load level of the power grid system by an additional load increment to accommodate the power demand level for performing the automated power charging process; and charging, using the power grid system, electric vehicles not in the subset of the electric vehicles based on the override mode while separately charging the subset of the electric vehicles using an additional power source that is separate from the power grid system.

2. The method of claim 1, wherein the subset of the electric vehicles is charged at a lower predetermined charging rate than a desired charging rate.

3. The method of claim 1, wherein the mission requirements include at least one of: a battery operational period, a battery life time, a battery state of charge, a number of mileage, and an area to be covered by the one or more electric vehicles.

4. The method of claim 1, further comprising applying an internal combustion engine (ICE) mode in addition to the override mode for performing the automated power charging process, wherein the ICE mode uses an on-board ICE for charging the one or more electric vehicles.

5. The method of claim 4, wherein the on-board ICE includes a range-extender.

6. The method of claim 1, further comprising applying an internal combustion engine (ICE) mode in addition to the override mode for performing the automated power charging process, wherein the ICE mode uses an off-board ICE for charging the one or more electric vehicles.

7. The method of claim 6, wherein the off-board ICE includes a local genset.

8. The method of claim 1, wherein the additional power source includes one or more other electric vehicles that are independent of the subset.

9. The method of claim 1, wherein the additional power source includes an on-board or off-board internal combustion engine (ICE).

10. The method of claim 9, wherein the on-board ICE includes a range-extender or the off-board ICE includes a local genset.

11. The method of claim 1, wherein the additional power source includes one or more external rechargeable energy storage supplies.

12. The method of claim 11, wherein the one or more external rechargeable energy storage supplies include one or more batteries.

13. The method of claim 1, wherein the additional load increment is based on historical or empirical data relating to one or more of the plurality of electric vehicles.

14. A system for performing an automated power charging process for a plurality of electric vehicles using a processor, comprising:

the processor having a charge controller configured to:
communicate with a power grid system via a network to determine a capacity of the power grid system;

determine that a power demand level of the electric vehicles to satisfy one or more mission requirements of each electric vehicle is greater than the capacity of the power grid system;

in response to the determining, electrically separate a subset of the electric vehicles from the power grid system;

apply an override mode for performing the automated power charging process, wherein the override mode increases a maximum power load level of the power grid system by an additional load increment to accommodate the power demand level; and automatically charge electric vehicles not in the subset of the electric vehicles using the power grid system based on the override mode while separately charging the subset of the electric vehicles using an additional power source that is separate from the power grid system.

15. The system of claim 14, wherein the subset of the electric vehicles is charged at a lower predetermined charging rate than a desired charging rate.

16. The system of claim 14, wherein the additional power source includes an on-board or off-board internal combustion engine (ICE).

17. The system of claim 16, wherein the on-board ICE includes a range-extender or the off-board ICE includes a local genset.

18. The system of claim 14, wherein the additional power source includes one or more external rechargeable energy storage supplies.

19. The system of claim 18, wherein the one or more external rechargeable energy storage supplies include one or more batteries.

20. An electric vehicle comprising:
an on-board processing unit configured to operatively couple with a power grid system; and
a memory unit having instructions that, in response to execution by the processing unit, cause the processing unit to:
communicate with the power grid system via a network to determine a capacity of the power grid system;
determine that a power demand level of a plurality of electric vehicles to satisfy one or more mission requirements of each electric vehicle is greater than the capacity of the power grid system, wherein the plurality of electric vehicles include the electric vehicle and one or more additional electric vehicles;
in response to the determining, electrically separate a subset of the electric vehicles from the power grid system;
apply an override mode for performing the automated power charging process, wherein the override mode increases a maximum power load level of the power grid system by an additional load increment to accommodate the power demand level; and
automatically charge electric vehicles not in the subset of the electric vehicles using the power grid system based on the override mode while separately charging the subset of the electric vehicles using an additional power source that is separate from the power grid system.

21. The electric vehicle of claim 20, wherein the subset of the electric vehicles is charged at a lower predetermined charging rate than a desired charging rate.

22. The electric vehicle of claim 20, further comprising an on-board internal combustion engine (ICE) operatively coupled with the processing unit, wherein the instructions further cause the processing unit to:

apply an ICE mode in addition to the override mode for performing the automated power charging process, wherein the ICE mode uses the on-board ICE for charging the one or more additional electric vehicles.

23. The electric vehicle of claim 20, the processing unit operatively coupled with an off-board internal combustion engine (ICE), wherein the instructions further cause the processing unit to:
apply an ICE mode in addition to the override mode for performing the automated power charging process, wherein the ICE mode uses the off-board ICE for charging the one or more additional electric vehicles.

24. The electric vehicle of claim 20, wherein the network includes a vehicle-to-vehicle (V2V) network configured to facilitate communication between the plurality of electric vehicles.

25. The electric vehicle of claim 20, wherein the additional load increment is based on historical or empirical data relating to one or more of the plurality of electric vehicles.

* * * * *